(No Model.) 2 Sheets—Sheet 2.
T. HILL.
DUMPING CART.
No. 420,941. Patented Feb. 11, 1890.
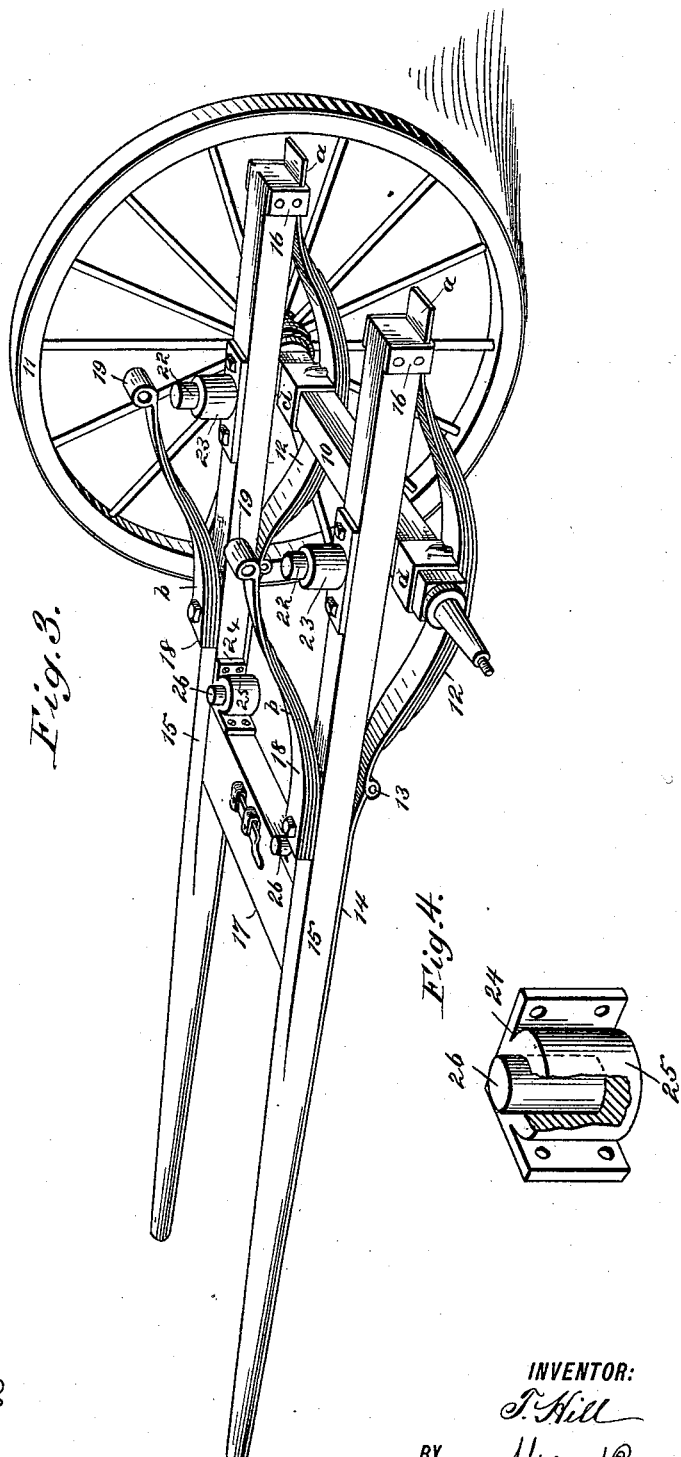
WITNESSES:
INVENTOR:
T. Hill
BY Munn & Co.
ATTORNEYS.

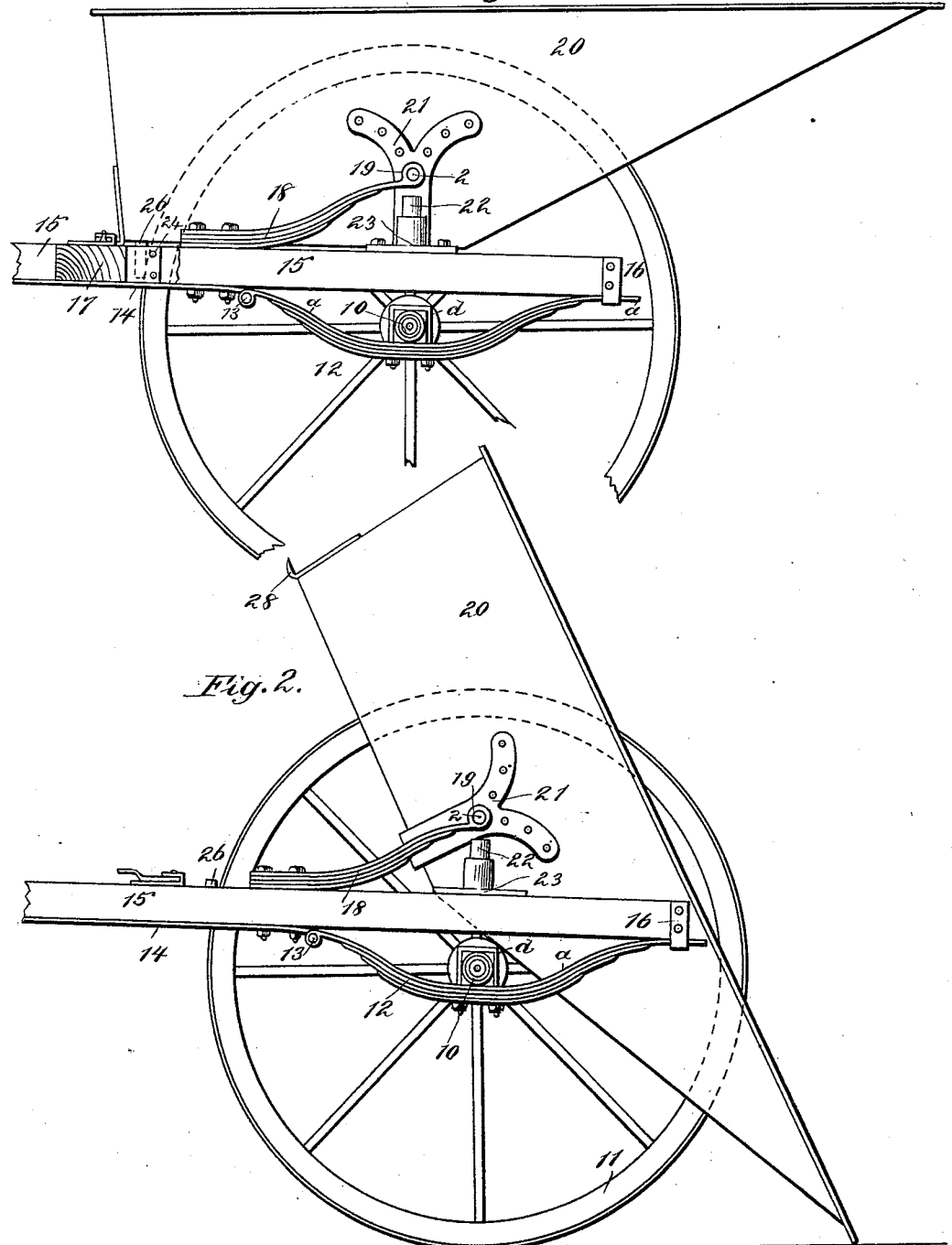

UNITED STATES PATENT OFFICE.

THOMAS HILL, OF JERSEY CITY, NEW JERSEY.

DUMPING-CART.

SPECIFICATION forming part of Letters Patent No. 420,941, dated February 11, 1890.

Application filed May 29, 1889. Serial No. 312,502. (No model.)

*To all whom it may concern:*

Be it known that I, THOMAS HILL, of Jersey City, in the county of Hudson and State of New Jersey, have invented a new and useful Improvement in Dumping-Carts and other Vehicles, of which the following is a full, clear, and exact description.

This invention relates to carts and other vehicles, the main objects of the invention being to so mount and support the shafts or booms upon the axle and the cart-body upon the shafts or booms that there will be practically no rattling, and the draft-animal will be relieved of all undue shock and jar incident to the movement of the vehicle over rough ground; and to the end named the invention consists of certain novel constructions, arrangements, and combinations of elements to be hereinafter fully described, and specifically pointed out in the claims.

Reference is to be had to the accompanying drawings, forming a part of this specification, in which similar figures and letters of reference indicate corresponding parts in all the views.

Figure 1 is a side view of my improvement as applied to a dumping-cart, parts being broken away and the left-hand wheel being removed. Fig. 2 is a similar view, the cart-body being shown as it appears when in the dumping position. Fig. 3 is a perspective view of the running-gear and cart-body supporting springs carried thereby, the left-hand wheel being removed; and Fig. 4 is a detail perspective view of one of the forward buffers and its supporting-bracket, parts being broken away.

In the drawings, 10 represents the cart-axle, upon which the wheels 11 are mounted in the usual manner. To the axle 10, I connect leaf-springs 12, said springs being held to place by clips $d$, which overlap the axle, the spring-brakes being beneath the axle. The forward ends of the springs 12 are connected by bolts 13 to straps 14, that are bolted to the shafts or booms 15, the rear ends of the booms resting upon the main leaf $a$ of the springs, the parts being held against displacement by straps 16, that are bolted to the booms, the spring-leaves $a$ passing between the under faces of the booms and the upper faces of the horizontal lengths of the straps.

The shafts or booms 15 are connected in the usual manner by a cross-bar 17, which constitutes the foot-board of the cart. To the upper faces of the shafts or booms I secure leaf-springs 18, the overlying members $b$ of said springs being formed with eyes 19, which said eyes are arranged to receive laterally-extending pivots or trunnions 2, that are connected to the cart-body 20 by brackets 21, the arrangement being such that the shafts or booms are yieldingly upheld above the axle, while the cart-body is yieldingly upheld above the shafts or booms.

The tension of the springs 18 is such that the springs will support an unloaded cart-body; but in order that the springs may be relieved of all undue tension when the cart is loaded I arrange elastic buffers 22 beneath the cart-body trunnions, such buffers being housed within pedestals 23, that are carried by the shafts or booms.

The above-described arrangement of springs is such that all of the springs are called into play and all help to support the load carried by the cart-body. The forward end of the cart-body is yieldingly upheld by buffer-springs 26, that are mounted in housings 25, carried by angular brackets 24, secured in the corners or angles to the rear of the cross-bar or foot-board 17, such buffer-springs serving not only as a support for the forward end of the cart-body, but preventing such forward end from coming in direct contact with the booms or shafts, and consequently the springs prevent all undue rattling.

Although I prefer that the springs 18 should be formed as above described and as illustrated in the drawings, still I desire it to be understood that such springs might be semi-elliptical, in which case one end of each spring would be held to slide upon the shafts or booms, as is the case with the springs 12.

Having thus described my invention, I claim as new and desire to secure by Letters Patent—

1. In a dumping-cart, the combination, with the running-gear, of a cart-body provided with side pivots or trunnions and leaf-springs carried by the running-gear and arranged to be engaged by the side pivots or trunnions, substantially as described.

2. In a dumping-cart, the combination, with the running-gear, of a cart-body provided with side trunnions or pivots and leaf-springs carried by the running-gear and formed with eyes in which said body-trunnions or pivots ride, substantially as described.

3. In a dumping-cart, the combination, with the running-gear, of a cart-body provided with side trunnions or pivots and leaf-springs carried by the running-gear, the overlying spring-leaves being formed with eyes in which the body-trunnions ride, substantially as described.

4. In a vehicle, the combination, with the axle, of springs connected thereto, shafts or booms, a pivotal connection between the forward ends of the springs and the shafts or booms, and a sliding connection between the rear ends of the springs and the shafts or booms, substantially as described.

5. In a vehicle, the combination, with the axle, of springs connected thereto, shafts or booms, connections, substantially as described, between the shafts or booms and the springs, leaf-springs carried by the shafts or booms, a cart-body provided with side trunnions which ride in eyes carried by the leaf-springs, and buffer-springs arranged beneath the body-trunnions, substantially as described.

6. In a dumping-cart, the combination, with the running-gear, of a cart-body provided with side trunnions, leaf-springs carried by the running-gear and formed with eyes in which the body-trunnions ride, and buffer-springs arranged beneath the body-trunnions, substantially as described.

7. In a dumping-cart, the combination, with the running-gear, of a cart-body carried thereby and buffer-springs connected to the running-gear beneath the forward portion of the cart-body, substantially as described.

THOMAS HILL.

Witnesses:
C. SEDGWICK,
EDWD. M. CLARK.